United States Patent
Chien et al.

(10) Patent No.: US 8,270,715 B2
(45) Date of Patent: Sep. 18, 2012

(54) METHOD FOR CORRECTING RED-EYE

(75) Inventors: Chung-Fang Chien, Taipei (TW); Che-Lun Chuang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 906 days.

(21) Appl. No.: 12/339,723

(22) Filed: Dec. 19, 2008

(65) Prior Publication Data

US 2009/0161951 A1 Jun. 25, 2009

(30) Foreign Application Priority Data

Dec. 21, 2007 (TW) .............................. 96149523 A

(51) Int. Cl.
*G06K 9/00* (2006.01)
(52) U.S. Cl. ..................................................... 382/167
(58) Field of Classification Search .................. None
See application file for complete search history.

(56) References Cited

U.S. PATENT DOCUMENTS

| | | | | |
|---|---|---|---|---|
| 5,432,863 A * | 7/1995 | Benati et al. | ................... | 382/167 |
| 6,714,665 B1 * | 3/2004 | Hanna et al. | ................... | 382/117 |
| 7,298,412 B2 * | 11/2007 | Sannoh et al. | ................ | 348/348 |
| 7,327,886 B2 * | 2/2008 | Ito | .................................. | 382/190 |
| 7,567,707 B2 * | 7/2009 | Willamowski et al. | ........ | 382/167 |
| 7,825,948 B2 * | 11/2010 | Van Geest et al. | .............. | 348/51 |
| 7,916,904 B2 * | 3/2011 | Suzuki et al. | ................. | 382/118 |
| 2005/0169520 A1 * | 8/2005 | Chen et al. | ..................... | 382/165 |
| 2005/0232481 A1 * | 10/2005 | Wu | ................................. | 382/167 |
| 2005/0243348 A1 * | 11/2005 | Yonaha | .......................... | 358/1.9 |
| 2007/0024723 A1 * | 2/2007 | Ichimasa et al. | ......... | 348/231.99 |
| 2007/0070408 A1 * | 3/2007 | Ono et al. | .................... | 358/1.15 |

* cited by examiner

*Primary Examiner* — Samir Ahmed

(74) *Attorney, Agent, or Firm* — Rabin & Berdo, P.C.

(57) ABSTRACT

A method for correcting red-eye is described. Through facial features, at least one facial region is obtained in an image, a nose position in each facial region is obtained by using a nose feature, and at least one eye position is obtained based on a relative position relation between the nose and the eyes. After a color gamut of the image is converted, a red region is obtained from the eye position, and a plurality of edges is formed by using a luminance of the color gamut on the image with the converted color gamut according to the eye feature, so as to exclude the red region out of the plurality of edges, thereby improving accuracy of the red region on the eye position. Then, the red region is covered by an iris color, so as to correct the red-eye.

8 Claims, 2 Drawing Sheets

METHOD FOR CORRECTING RED-EYE

CROSS-REFERENCE TO RELATED APPLICATIONS

This non-provisional application claims priority under 35 U.S.C. §119(a) on Patent Application No(s). 096149523 filed in Taiwan, R.O.C. on Dec. 21, 2007 the entire contents of which are hereby incorporated by reference.

BACKGROUND OF THE INVENTION

1. Field of Invention

The present invention relates to a method for correcting red-eye, and more particularly, to a method for correcting red-eye by using a color gamut.

2. Related Art

When portrait is shoot indoor or at night outdoor, it is quite easily to see that eyes of the portrait are red on the formed image, that is, the so-called red-eye. The reason of the red-eye is pupil expansion and shrinkage generated by human basic physiological reaction in response to the light rays. Under the bright light rays, the pupils are small, and under low light environment, the pupils become quite big. When the flash lamp flashes, the light ray passes through the enlarged pupils, and reflects light rays of back vessels of retinas in the eyes. When the light rays are reflected back to the camera, it is displayed in the form of disgusting red points. The pupil expansion and shrinkage is natural physiological reaction, which cannot be changed. Therefore, in order to prevent the generation of the red-eye on the portrait, the manufacturers firstly dispose a so-called anti-red-eye function on the photographic device, such that the flash lamp can continuously flash twice. The first flash is used to stimulate the pupils, such that the pupils shrink, and the second flash is the photographic action. In this manner, the probability of the generation of the red-eye becomes smaller as the pupils shrink, but it is impossible to wholly inhibit the generation of the red-eye.

The manufacturers begin to modify the red-eye region in the image by using software setting, so as to achieve an effect of eliminating the red-eye by compensation or correction etc. Recently, in the method used by the manufacturers, firstly, a facial position of the portrait is confirmed by using a facial searching method, and then the facial red region of the portrait is eliminated. However, the method usually obtains the red region which is not the eye on the face of the portrait. Alternatively, the effect of eliminating the red-eye is achieved by detecting the white. However, when it is applied to side face photography, it is impossible to obtain the red-eye position, such that it is impossible to perform the compensation action. Even when the portrait is shot when the person looks upward or downward, the recent searching method may omit the red-eye phenomenon.

SUMMARY OF THE INVENTION

In order to effectively eliminate the red-eye phenomenon, the present invention provides a method capable of effectively obtaining an eye position from facial features, and greatly improving the accuracy of searching the red-eye.

A method for correcting the red-eye provided by the present invention includes obtaining an image; obtaining at least one facial region from the image by using at least one facial feature; obtaining a nose position from each facial region by using at least one nose feature; obtaining at least one eye position from each facial region according to the nose position; obtaining one red region on the eye position according to at least one eye feature; and correcting the red region.

Before the step of obtaining the red region on the eye position, a color gamut of the image is converted, such that the color gamut of the image comprises a luminance. The step of obtaining the red region on the eye position includes performing luminance edge detection according to the eye feature, thereby obtaining the red region, and obtaining the red region having at least one white region nearby on the eye position in the converted color gamut of the image.

In the method for correcting the red-eye according to the present invention, through facial features, at least one facial region is obtained in an image, and a nose position in each facial region is obtained by using a nose feature, so as to obtain at least one eye position according to the nose position. After the color gamut of the image is converted through image conversion, a red region having at least one white region nearby on the eye position is obtained. At the same time, at least three edges of line segment or arc similar to the line segment are formed by using a luminance of the color gamut on the image with the converted color gamut according to the eye feature, so as to exclude the red region out of the three edges, thereby improving accuracy of the red region on the eye position. Then, the red region is covered by an iris color, so as to correct the red-eye.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
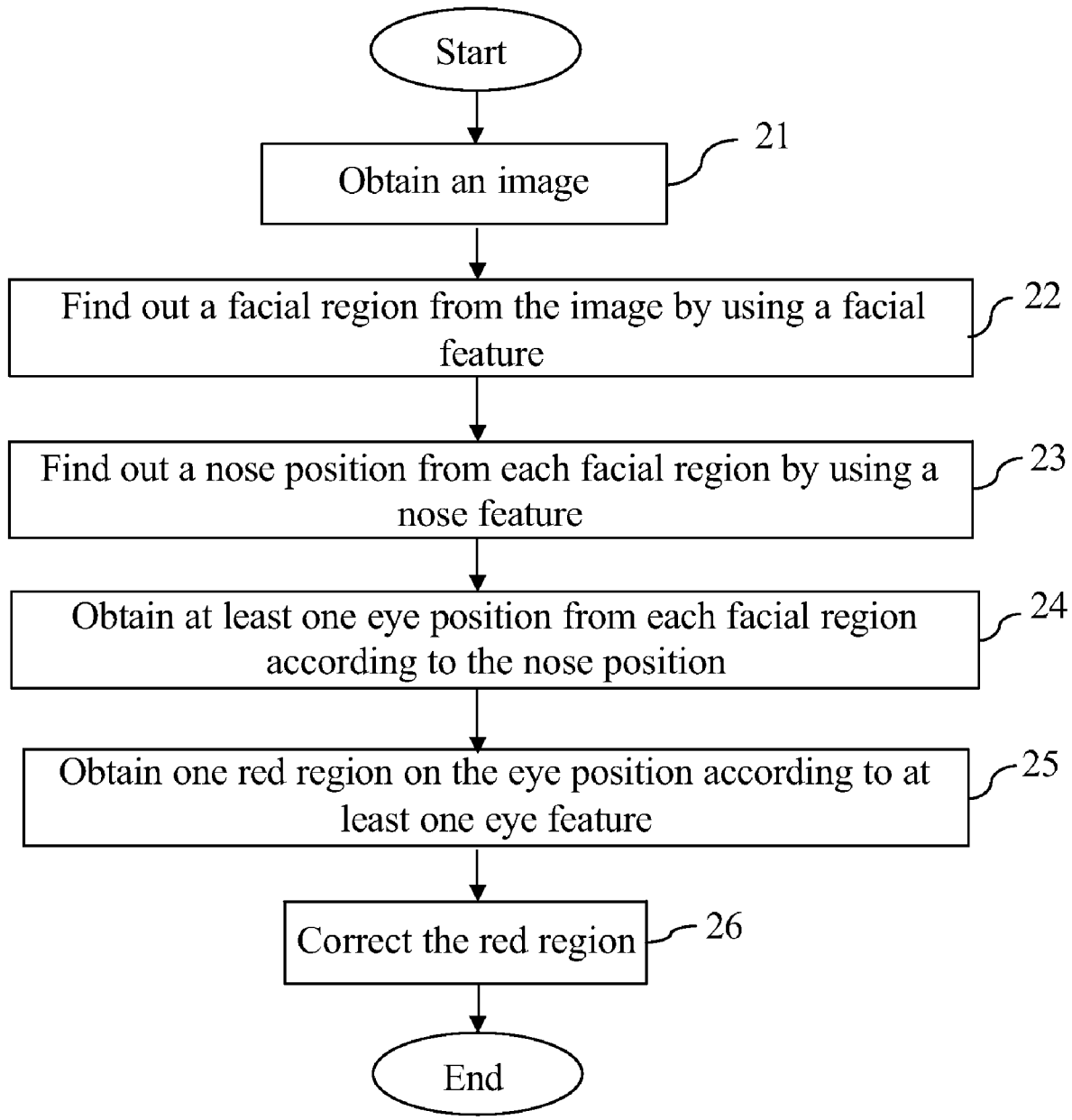
FIG. 1 is a flow chart of procedure of the method according to a first embodiment of the present invention.

Referring to FIG. 1, a flow chart of procedure of the method according to a first embodiment of the present invention is shown. The method for correcting the red-eye provided by the present invention includes obtaining an image (step 21), obtaining at least one facial region from the image by using at least one facial feature (step 22), obtaining a nose position from each facial region by using at least one nose feature (step 23), obtaining at least one eye position from each facial region according to the nose position (step 24), obtaining one red region on the eye position according to at least one eye feature (step 25), and correcting the red region (step 26).

In this embodiment, an image is obtained through a camera, a video camera, or other device, and at least one facial region is obtained from the image by using at least one facial feature, in which the method for obtaining the facial feature is to search for a shape with an outline of round or ellipse etc in the image. Next, the nose position is obtained from the image by using at least one nose feature. Definitely, a position of one selected from among eyebrow, mouth, ear, and hair is obtained by using the feature of one selected from among eyebrow, mouth, ear, and hair. The method for obtaining the nose feature is to search for a shape with an outline similar to triangle in the facial region. The eye position in each facial region is obtained by using a relative position relation between the nose and the eyes. Alternatively, it is also possible to firstly obtain the position of eyebrow, mouth, ear, or hair by using the feature of eyebrow, mouth, ear, or hair, and then to obtain the eye position in each facial region by using a relative position relation between the eyebrow, mouth, ear, or hair and the eyes. Definitely, it is also possible to obtain the eye position in each facial region by using the position of at least one of eyebrow, mouth, ear, and hair, and the nose position. According to the eye feature that the white is around the iris, so a region having at least one white region in the nearby region is obtained on the eye position in the image, so as to improve the accuracy of the red region at the eye position, that is, the red region is the red-eye position in the image. The method of correcting the red-eye is to correct the red-eye by covering the red region with an iris color. As races are different, the iris colors can be black, blue, green, or amber etc. The correction performed by using the iris color can accurately correct eye colors of various races. Definitely, the saturation values of three primary colors (red, green, and blue) at the red-eye position can be adjusted, so as to display the original color.

Figure 2:
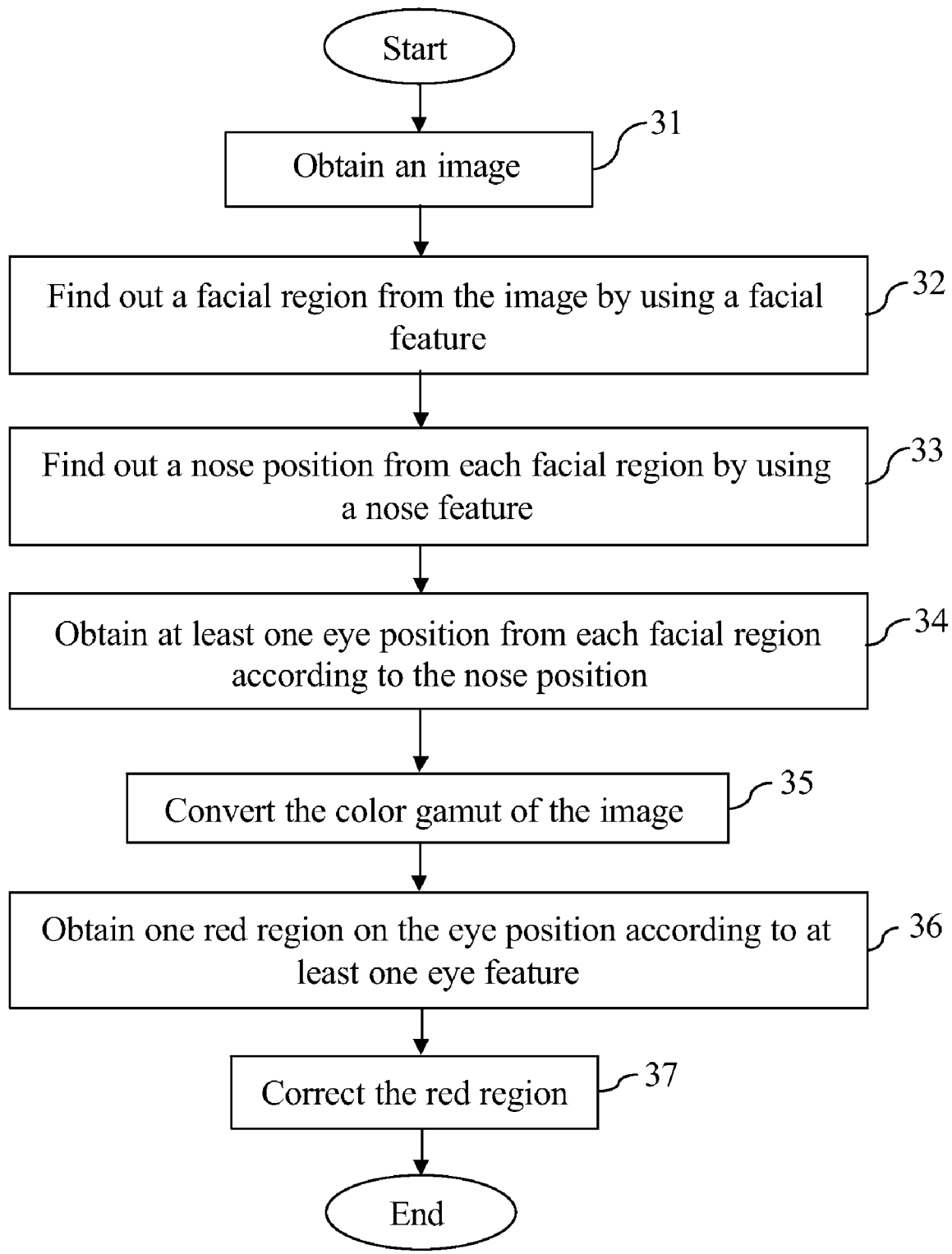
FIG. 2 is a flow chart of procedure of the method according to a second embodiment of the present invention.

Referring to FIG. 2, a flow chart of procedure of the method according to a second embodiment of the present invention is shown. The method for correcting the red-eye provided by the present invention includes obtaining an image (step 31), obtaining at least one facial region from the image by using at least one facial feature (step 32), obtaining a nose position from each facial region by using at least one nose feature (step 33), obtaining at least one eye position from each facial region according to the nose position (step 34), converting a color gamut of the image (step 35), obtaining one red region on the eye position according to at least one eye feature (step 36), and correcting the red region (step 37).

In this embodiment, an image is obtained through a camera, a video camera, or other device, and at least one facial region is obtained from the image by using at least one facial feature, in which the method for obtaining the facial feature is to search for a shape with an outline of round or ellipse etc in the image. Next, the nose position is obtained from the image by using at least one nose feature. Definitely, a position of one selected from among eyebrow, mouth, ear, and hair is obtained by using the feature of one selected from among eyebrow, mouth, ear, and hair. The method for obtaining the nose feature is to search for a shape with an outline similar to triangle in the facial region. The eye position in each facial region is obtained by using a relative position relation between the nose and the eyes. Alternatively, it is also possible to firstly obtain the position of eyebrow, mouth, ear, or hair by using the feature of eyebrow, mouth, ear, or hair, and then to obtain the eye position in each facial region by using a relative position relation between the eyebrow, mouth, ear, or hair and the eyes. Definitely, it is also possible to obtain the eye position in each facial region by using the position of at least one of eyebrow, mouth, ear, and hair, and the nose position. Then, the color gamut of the image is converted, and the color gamut is a color gamut represented by the luminance. The color gamut can be YCrCb color gamut composed of Y representing the luminance, Cr representing red, and Cb representing blue. Definitely, the color gamut can be HSL color gamut composed of H representing the hue, S representing the saturation, and L representing the luminance. Next, we use edge detection to obtain the red region on the eye position of the image with the converted color gamut. The edge detection is performed near the eye position by using the luminance of the color gamut after being converted. And a plurality of edges is formed according to at least one of skin, iris edge, eyelid, white, and canthus, so as to exclude the red region out of the plurality of edges, thereby improving the accuracy of the red region on the eye position. The method of correcting the red-eye is to correct the red-eye by covering the red region with an iris color. As races are different, the iris colors can be black, blue, green, or amber etc. The correction performed by using the iris color can accurately correct eye colors of various races. Definitely, the saturation values of three primary colors (red, green, and blue) at the red-eye position can be adjusted, so as to display the original color.

What is claimed is:

1. A method for correcting red-eye, comprising:
    obtaining an image;
    obtaining at least one facial feature from the image;
    obtaining at least one facial region from the image by using the at least one facial feature;
    obtaining at least one nose feature from the image;
    obtaining a nose position from each facial region by using the at least one nose feature;
    obtaining at least one eye position from each facial region according to the nose position;
    obtaining at least one eye feature from the image by obtaining at least one white region on the at least one eye position;
    obtaining a red region on the at least one eye position according to the at least one eye feature, the red region having the at least one white region nearby on the at least eye position; and
    correcting the red region by covering the red region with an iris color.

2. The method for correcting red-eye according to claim 1, further comprising prior to obtaining the red region on the at least one eye position, converting a color gamut of the image.

3. The method for correcting red-eye according to claim 2, wherein obtaining the red region on the at least one eye position comprises obtaining the red region on the at least one eye position by using the converted color gamut of the image.

4. The method for correcting red-eye according to claim 2, wherein converting the color gamut of the image comprises converting the image to another image that is represented by a color gamut comprising a luminance.

5. The method for correcting red-eye according to claim 4, wherein obtaining the red region on the at least one eye position comprises performing an edge detection according to the at least one eye feature by using the luminance, thereby obtaining the red region.

6. The method for correcting red-eye according to claim 5, wherein detecting the edges comprises forming a plurality of edges according to at least one of a skin, an iris edge, an eyelid, a white area, and a canthus.

7. The method for correcting red-eye according to claim 1, wherein obtaining the at least one eye position in each facial region, comprises obtaining the at least one eye position in each facial region according to a position of at least one of an eyebrow, a mouth, an ear, and a hair.

8. The method for correcting red-eye according to claim 1, wherein obtaining the red region includes using the at least one white region to determine the red region.

* * * * *